United States Patent [19]

Stewart et al.

[11] 4,386,718

[45] Jun. 7, 1983

[54] LIQUID DISPENSING MEANS WITH NOVEL AIR BLEED VALVE

[76] Inventors: David P. J. Stewart; Richard M. Bonnin, both of 47A Penrose St., Lane Cove, Sydney, N.S.W., Australia, 2066

[21] Appl. No.: 202,121

[22] Filed: Oct. 30, 1980

[30] Foreign Application Priority Data

Jul. 8, 1980 [AU] Australia .............................. PE4432

[51] Int. Cl.³ ............................................... B67D 3/00
[52] U.S. Cl. .................................... 222/185; 222/482; 137/850; 137/853
[58] Field of Search .................... 222/185, 481, 481.5, 222/482, 490; 137/844, 848, 849, 850, 853

[56] References Cited

U.S. PATENT DOCUMENTS

| | | | |
|---|---|---|---|
| 152,397 | 6/1874 | Messmer | 222/481.5 |
| 223,396 | 1/1880 | Shabley | 222/481.5 X |
| 480,400 | 8/1892 | De Wolfe | 137/853 X |
| 2,708,056 | 5/1955 | Reid | 222/481 |
| 3,042,267 | 7/1962 | Reynard | 222/185 |
| 3,086,683 | 4/1963 | Loper | 222/185 X |

Primary Examiner—Joseph J. Rolla
Assistant Examiner—Frederick R. Handren
Attorney, Agent, or Firm—Nelson E. Kimmelman

[57] ABSTRACT

A dispenser of liquid from an inverted rigid screw neck container, the dispenser comprising a base with an upwardly directed socket to receive the container neck in a liquid tight manner, a port to discharge liquid to a threaded nose to be coupled to a tap, an air bleed arrangement to deliver atmospheric air through a stem and a one way valve into a container when mounted on the base.

7 Claims, 3 Drawing Figures

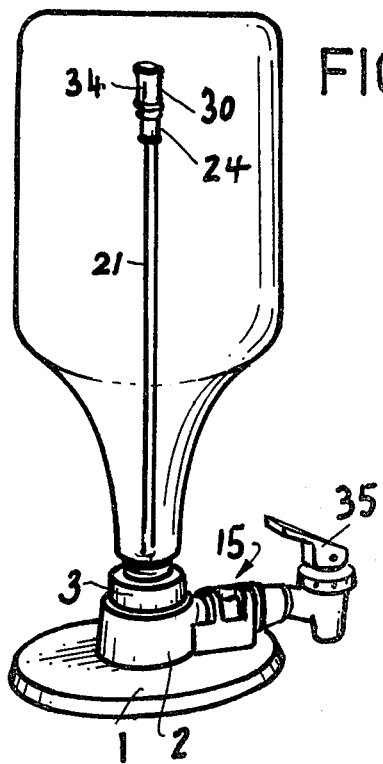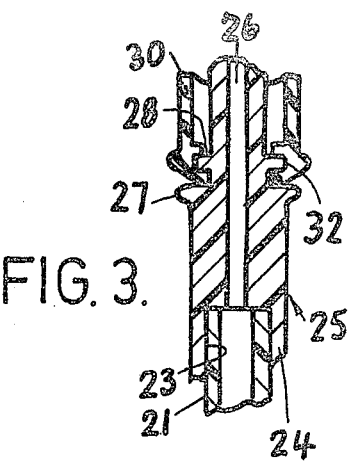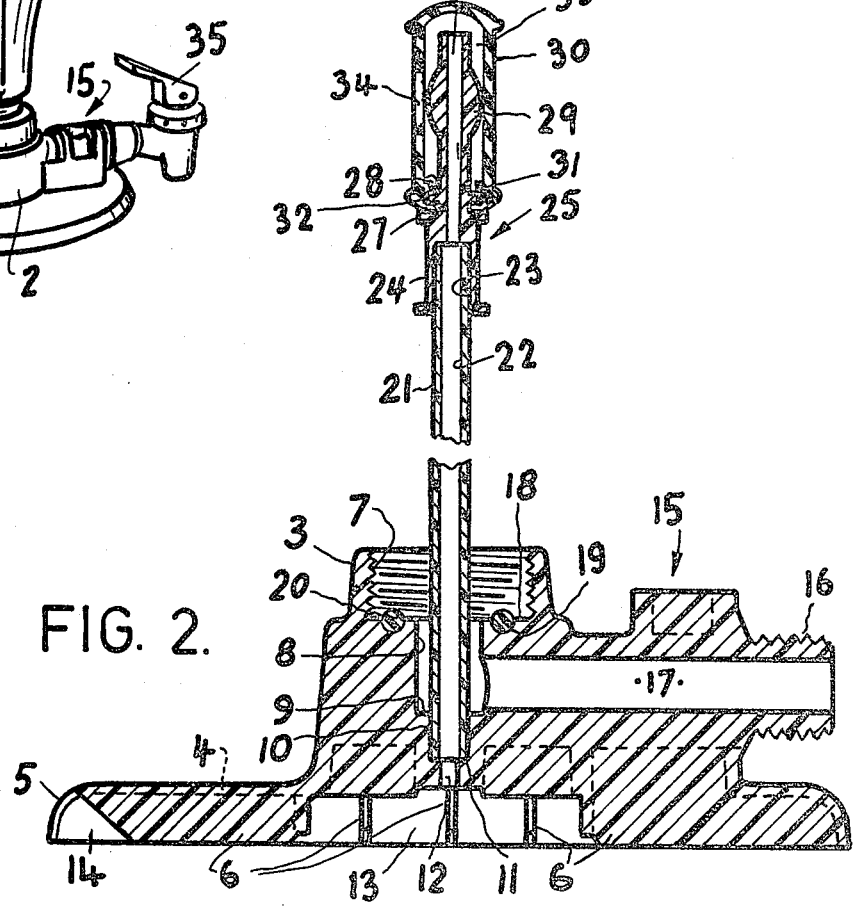

LIQUID DISPENSING MEANS WITH NOVEL AIR BLEED VALVE

This invention relates to dispensing means for liquid housed in a rigid container. The invention has particular, but not exclusive, application to large glass containers for wines commonly called flagons and which are of approximately two liters capacity.

A flagon is conventionally handled as is any other large liquid containing glass bottle. Specifically, the closure lid is first removed from the flagon and the flagon is grasped, in this case with two hands because of the weight of the flagon and its contents, and part of the contents is poured into a drinking glass. The flagon is then set down on its base and the closure lid is replaced. The disadvantage of this procedure is that as both hands are occupied with holding of the flagon the drinking glass is left without any control and often the gush of liquid into the glass can tip it over. Recently, so called casks have been developed which comprise a liquid filled plastic bag housed in a cardboard box. The box has a bottom and there is a valve adjacent the bottom of the box and projecting from one side thereof. The valve is in communication with the interior of the plastic bag so that the contents of the bag can be discharged on actuation of the valve. The cask concept has the advantage over the flagon concept that the user needs only one hand to operate the valve and the other hand can be used to hold and position the drinking glass below the valve.

Mainly for the above reason glass flagons have become less popular despite several advantages over casks of the above described type, advantages such as the robustness of a flagon which, whilst made of a breakable material, is designed to be very strong and the transparency of glass which is so important in the presentation of a product such as a red wine. The inert and impervious nature of glass ensures there is no contamination of the liquid in the flagon from or through the flagon.

Flagons have also been criticised because the time and effort required to dispense liquid into a glass from a flagon exceeds that required for dispensing from a cask. There is also the factor of fashion; it has become fashionable to have beverages in casks; large glass containers, e.g. flagons, have become unfashionable.

The dispenser of this invention serves two purposes, firstly to discharge liquid on demand from a flagon or like rigid container with single hand operation, and secondly to provide a support to safely mount a container in an inverted position with its outlet lowermost and yet sealed against unintentional discharge of the liquid contents. In order to achieve these objectives applicants have developed a support having features that enable a dispensing tap to be placed in communication with the interior of the rigid container mounted on the support, and to admit air thereinto as the contents are dispensed, thereby preventing a negative pressure condition in the container which would inhibit proper outflow of the contents when the valve is operated.

The invention can be summarised as dispensing means for liquid, said dispensing means comprising a base, a boss on the base, a stepped bore in the boss, threads in a first part of the bore at the upper end of the boss to be engaged by the threaded neck of an inverted liquid container, a shoulder where the bore decreases in size from the first bore part to a second bore part, annular sealing means in the shoulder encircling the second bore part, a lateral port extending from the second bore part to atmosphere, a threaded nose on the boss through which said port exits to atmosphere, a third bore part, an elongated tubular stem externally sealingly engaged in the third bore part and extending through the second and first bore parts, air bleed means for atmosphere to the third bore part so as to place the bore of the stem in communication with the atmosphere, a one way valve means on the other end of the stem to permit air entering the stem through the air bleed means to exit through the one way valve.

A presently preferred embodiment of the invention will now be described with reference to the accompanying drawings in which:

FIG. 1 is a perspective view of the dispenser fitted with a tap and supporting a flagon;

FIG. 2 is a sectional side view of the dispenser shown in FIG. 1 with the tap and flagon removed; and FIG. 3 is an enlarged sectional view of part of the valve arrangement to admit air to the flagon as the contents are dispensed.

As illustrated there is a circular base 1 on top of which is an upwardly tapered boss 2 and at its upper end there is a smaller diameter upwardly tapered second boss 3. The base comprises a thin upper web 4 which extends down to form a peripheral skirt 5 and the underface of the web is ribbed as at 6 to provide economy of material and strength in the base.

Extending through the bosses 2 and 3 there is a stepped bore which is threaded at 7 in the boss 3, a smaller cross-section bore portion 8 extends from the threaded portion 7 part-way through the boss 2 and terminates in a step 9 at the commencement of a smaller cross-section bore portion 10. The bore portion 10 terminates in a step 11 at the commencement of a still smaller cross-section bore portion 12 which exits to a zone 13 in the underface of the base 1. The bore portion 12 is in communication with the atmosphere when the base is on a surface, e.g. a table, by means of the gaps between the ribs 6 and notch 14 in the skirt 5.

Extending radially from the boss 2 there is a housing 15 with a threaded nose 16 and a central bore 17 which places the bore portion 8 in the boss 2 in communication with the atmosphere through the nose 16. The housing 15 is formed integrally with the base and the boss 2 and has a ribbed configuration designed to provide strength and an economy in material of manufacture.

The threaded nose 16 is adapted to be engaged by a threaded socket of a dispensing tap as illustrated in FIG. 1.

The threaded bore portion 7 is adapted to be engaged by the threaded neck of a flagon or other like container. At this point it is to be recognised that whilst the invention has been devised particularly for flagons of wine the use of the invention is not to be considered as so limited. For example oils or detergents in bottles or cans with threaded necks are only two examples of containers which can be used with the invention.

There is a shoulder 18 in the bore where portion 7 steps down in diameter to portion 8 and there is an annular groove 19 of generally semi-circular cross-section in the shoulder 18. An "O" ring 20 is housed in the groove 19 and the end of the threaded neck of the container is caused to sealingly engage the "O" ring as the neck of the container approaches the end of its screwed engagement with the bore portion 7.

A tubular stem 21 is sealingly engaged in the bore portion 10 so the bore 22 of the stem is in communication with the bore portion 12. At its upper end the stem 21 frictionally and sealingly engages in the bore 23 of a socket end 24 of a sleeve 25. A smaller diameter bore 26 extends through the remainder of the sleeve from the bore portion 23 thereof. The exterior of the sleeve 25 is provided with a first circumferential rib 27. A second like rib 28, only smaller in diameter, encircles the sleeve and is spaced a small distance from the first rib and further from the socket end 24. Still further from the socket end 24 there is a bulbous circumferential enlargement 29 of the exterior of the sleeve 25.

Enclosing the upper part of the sleeve 25 there is a resilient cover member 30 made from rubber, a like material may be used as an alternative. From the sectional views FIGS. 2 and 3 it will be seen that the cover 30 has a short tubular entrance 31 in which there is a circumferential groove 32 adapted to receive and sealingly embrace the rib 28. The cover has an interior parallel sided compartment 33 and the diameter thereof is slightly larger than the bulbous enlargement 29 on the sleeve 25. There is a longitudinal slit 34 in the cover 30 in the vicinity of the sleeve enlargement 29. It is to be noted that the upper free end of the sleeve 24 stops short of the interior end of the cover 30 to allow free flow of air into the interior of the cover.

In use the operation of the apparatus is as follows. A container neck is threaded into the bore 7 with the stem 21, surmounted by the sleeve/cover combination 25/30, projecting into the container and so the "O" ring 20 sealingly engages the end of the container neck. The assembly is inverted and sat on the base 1. The liquid contents of the container are now in direct contact with the tap 35 through bores 8 and 17. Operation of the tap 35 will allow liquid to escape from the assembly. The pressure in air gap above the liquid level in the container will become negative, or tend that way, as a result of the discharge of liquid. If no compensating air is admitted to the area above the liquid level repeated operations of the tap will eventually result in a "no flow" situation due to a high negative pressure condition in the upper liquid free portion of the container. This is prevented by the air admitting valve arrangement described above. Air will flow into the container from the zone of greater pressure (the atmosphere) to the zone of lesser pressure (the liquid free portion of the container) along the following route. That is through notch 14, between ribs 6, through bore portion 12, through bore 22 of stem 21, through bore 26 of the sleeve 25, into the compartment 33 of the cover 30 and then through the slit 34 into the container.

The edges of the slit 34 will separate, due to the resiliency of the cover, from their normal sealing condition to allow the air to pass through the slit and into the container. On the other hand the separation of the edges of the slit 34 to allow liquid to pass from the container to the interior of the cover 30 is prevented by the bulbous enlargement 29 which supports the interior surface of the cover 30 adjacent the slit 34 and prevents inward slit opening deflection of the cover 30. It has been found that rubber is an ideal material for the cover 30. Its elastic nature allows the sides of the slit 34 to abut in a sealing manner and also to deflect adjacent the slit 34 to allow air to pass therethrough in the required direction and then return to a position where the sides of the slit are again in sealing engagement.

We claim:

1. Dispensing means for liquid, said dispensing means comprising a base, a boss on the base, a stepped bore in the boss, means in a first part of the bore at the upper end of the boss for engaging the neck of an inverted liquid container, a shoulder where the bore decreases in size from the first bore part to a second bore part, sealing means in the shoulder encircling the second bore part, a lateral port extending from the second bore part to atmosphere, a nose on the boss through which said port exits to atmosphere, a third bore part, an elongated tubular stem externally sealingly engaged in the third bore part and extending through the second and first bore parts, air bleed means from atmosphere to the third bore part so as to place the bore of the stem in communication with the atmosphere, and a one way valve means on the other end of the stem to permit air entering the stem through the air bleed means to exit through the one way valve, said one way valve comprising a sleeve made of resilient material closed at one end and open at the other end, a longitudinal cut in the sleeve for part of its length to provide face to face sealing contact of the sides of the cut, a tubular adapter externally sealingly engaged on the said other end of the stem, a fluid tight connection of the open end of the sleeve to the adapter so as to position part of the adapter inside the sleeve, an external enlargement on the adapter behind and closely adjacent the cut in the sleeve to prevent inwards deflection of the sleeve at the cut.

2. Dispensing means as claimed in claim 1 where the enlargement on the adapter is generally bulbous in shape.

3. Dispensing means as claimed in claim 1 in which there is a rib and groove connection between the sleeve and the adapter to provide a fluid tight joint.

4. Dispensing means as claimed in claim 3 including a continuous circumferential rib on the adapter and a continuous groove at the open end of the sleeve to be sealingly engaged by the rib.

5. Dispensing means as claimed in claim 1 where said sealing means is an O ring in a groove in the shoulder.

6. Dispensing means as claimed in claim 1 including ribs on the underface of the base, an opening in the base whereby the underface of the base is in communication with the atmosphere when the underface rests on a surface, and wherein the air bleed means is a hole from the third part of the boss bore to the underface of the base.

7. Dispensing means for a liquid comprising: a base, a boss on the base, a stepped bore in the boss, means in a first part of said bore for engaging the neck of an inverted liquid container, a lateral port extending from a second part of said bore to the ambient atmosphere, an elongated stem fixed at one end in a third part of said bore and extending through said first and second bore parts, air bleed means from ambient atmosphere to said third bore part thereby allowing atmospheric air to enter a container when mounted in said means for engaging the neck of said container, said air bleed means including a first passageway which brings said third bore part into communication with the atmosphere, a second passageway which brings said third bore part to an air port in said stem, an elastically distendable sleeve engaging said stem to provide an air chamber between the stem and the sleeve and a barrier between said air port of said stem and the atmosphere outside the sleeve, a normally sealed aperture in the wall of said sleeve to allow air passing through said first and second passageways into said air chamber to escape from the chamber when said aperture is unsealed by elastic distention of the sleeve due to pressure in the air chamber exceeding the external pressure acting on the sleeve, and support surface means on the stem and contiguous with said aperture when said aperture is sealed, said support surface means being spaced from said aperture when the air pressure in said air chamber is greater than the air pressure immediately outside said chamber.

* * * * *